(12) United States Patent
Gupta et al.

(10) Patent No.: US 9,336,538 B2
(45) Date of Patent: May 10, 2016

(54) SYSTEMS AND METHODS FOR PROVIDING ADVERTISING SERVICES TO DEVICES WITH AN ADVERTISING EXCHANGE

(71) Applicants: Arvind Gupta, San Carlos, CA (US); Wayne Chan, Millbrae, CA (US); Raymond Myers, Foster City, CA (US); Sasha Solomon, San Francisco, CA (US); Daniel Kang, San Francisco, CA (US); Michael Deignan, San Francisco, CA (US)

(72) Inventors: Arvind Gupta, San Carlos, CA (US); Wayne Chan, Millbrae, CA (US); Raymond Myers, Foster City, CA (US); Sasha Solomon, San Francisco, CA (US); Daniel Kang, San Francisco, CA (US); Michael Deignan, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 0 days.

(21) Appl. No.: 14/260,152

(22) Filed: Apr. 23, 2014

(65) Prior Publication Data

US 2015/0287103 A1    Oct. 8, 2015

Related U.S. Application Data

(60) Provisional application No. 61/974,979, filed on Apr. 3, 2014.

(51) Int. Cl.
*G06Q 30/02*    (2012.01)

(52) U.S. Cl.
CPC ........ *G06Q 30/0277* (2013.01); *G06Q 30/0241* (2013.01); *G06Q 30/0251* (2013.01)

(58) Field of Classification Search
CPC ..................... G06Q 30/0241; G06Q 30/0251
USPC ................... 704/14.4, 14.49; 705/14.4, 14.49
See application file for complete search history.

(56) References Cited

U.S. PATENT DOCUMENTS

| | | | | |
|---|---|---|---|---|
| 6,571,279 | B1 * | 5/2003 | Herz et al. | 709/217 |
| 6,704,930 | B1 * | 3/2004 | Eldering et al. | 725/36 |
| 8,108,893 | B2 * | 1/2012 | Haberman et al. | 725/34 |
| 8,561,104 | B1 * | 10/2013 | Dow et al. | 725/34 |
| 2013/0110636 | A1 | 5/2013 | Bott | |
| 2016/0063244 | A1 * | 3/2016 | Zhang | H04N 21/44008 726/23 |

OTHER PUBLICATIONS

*Demand-side platform*, http://en.wikipedia.org/wiki/Demand-side_Platform, Mar. 24, 2014, 2 pages.
*View-through rate*, http://en.wikipedia.org/wiki/View-through_rate, Mar. 24, 2014, 2 pages.
*iab. Digital Video Ad Serving Template (VAST) 3.0*, http://www.iab.net/guidelines/508676/digital_video/vsuite/vast, Mar. 24, 2014, 3 pages.

(Continued)

*Primary Examiner* — David Stoltenberg
(74) *Attorney, Agent, or Firm* — Blakely, Sokoloff, Taylor & Zafman LLP (57) ABSTRACT

Methods and systems are described for providing advertising services to a device with an advertising exchange. In one embodiment, a system receives a configuration call from a device upon initiation of a software application and associated advertising services software on the device. The system sends a configuration file to the device in response to the configuration call. The configuration file includes different options for obtaining an advertisement (ad) to play on the device during an ad play event. The options include playing an ad cached on the device, obtaining at least one ad from an ad store of the system, and obtaining at least one ad from an advertising exchange that includes third party participants.

23 Claims, 6 Drawing Sheets

(56) References Cited

OTHER PUBLICATIONS

*iab. Video Ad Serving Template (VAST)*, Interactive Advertising Bureau, http://www.iab.net/vsuite/vast, Jul. 19, 2012, 71 pages.
International Search Report and the Written Opinion of the International Searching Authority for PCT/US2015/024166, mailed Jul. 21, 2015, 12 pages.
International Search Report and the Written Opinion of the International Searching Authority for PCT/US2015/024170, mailed Jul. 21, 2015, 12 pages.
"Rich Media Mobile Advertising Guidelines", https://www.mmaglobal.com/files/rmma.pdf, Sep. 8, 2013, 14 pages.
Mohan, Prashanth, et al., "Prefetching Mobile Ads: Can Advertising Systems Afford It?", *Computer System, ACM* 2 Penn Plaza, Suite 701 New York, NY 10121-0701 USA, Apr. 15, 2013, pp. 267-280.

* cited by examiner

SYSTEMS AND METHODS FOR PROVIDING ADVERTISING SERVICES TO DEVICES WITH AN ADVERTISING EXCHANGE

RELATED APPLICATIONS

This application claims the benefit of U.S. Provisional Application No. 61/974,979, filed on Apr. 3, 2014, the entire contents of which are hereby incorporated by reference.

This Application is related to application Ser. No. 14/260,155, filed Apr. 23, 2014, entitled: SYSTEMS AND METHODS FOR PROVIDING ADVERTISING SERVICES IN A PREDICTIVE MANNER TO DEVICES WITH AN ADVERTISING EXCHANGE.

FIELD OF THE INVENTION

Embodiments of the invention are generally related to systems and methods for providing advertising services to devices with an advertising exchange.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads.

SUMMARY

Methods and systems are described for providing advertising services for devices with an ad exchange. In one embodiment, a system includes a storage medium to store one or more software programs and processing logic that is configured to execute instructions of at least one software program to receive a configuration call from a device upon initiation of a software application and associated advertising services software on the device. The processing logic is further configured to send a configuration file to the device in response to the configuration call. The configuration file includes different options for obtaining an advertisement (ad) to play on the device during an ad play event. The options include playing at least one ad or ad campaign cached on the device, obtaining at least one ad or ad campaign from an ad store of the system, and obtaining at least one ad or ad campaign from an advertising exchange that includes third party participants.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Methods and systems are described for providing advertising services to devices using an ad exchange. In one embodiment, a system includes a storage medium to store one or more software programs and processing logic that is configured to execute instructions of at least one software program to receive a configuration call from a device upon initiation of a software application and associated advertising services software (e.g., software development kit (SDK)) on the device. The processing logic is further configured to send a configuration file to the device in response to the configuration call. The configuration file includes different options for obtaining an advertisement (ad) to play on the device during an ad play event. The options include playing at least one ad cached on the device, obtaining at least one ad from an ad store of the system, and obtaining at least one ad from an advertising exchange that includes $3^{rd}$ party participants. An auction system provides a mechanism for the $3^{rd}$ party participants to bid on providing advertising services including in-application (in-app) advertising services to the device. The auction system captures demand for providing advertising services in real time or near real time for the at least one ad being served and played on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of mobile applications and games. The publishers are interested in generating revenue through displaying video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC) or a cost-per-mille (CPM) basis with a mille representing a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
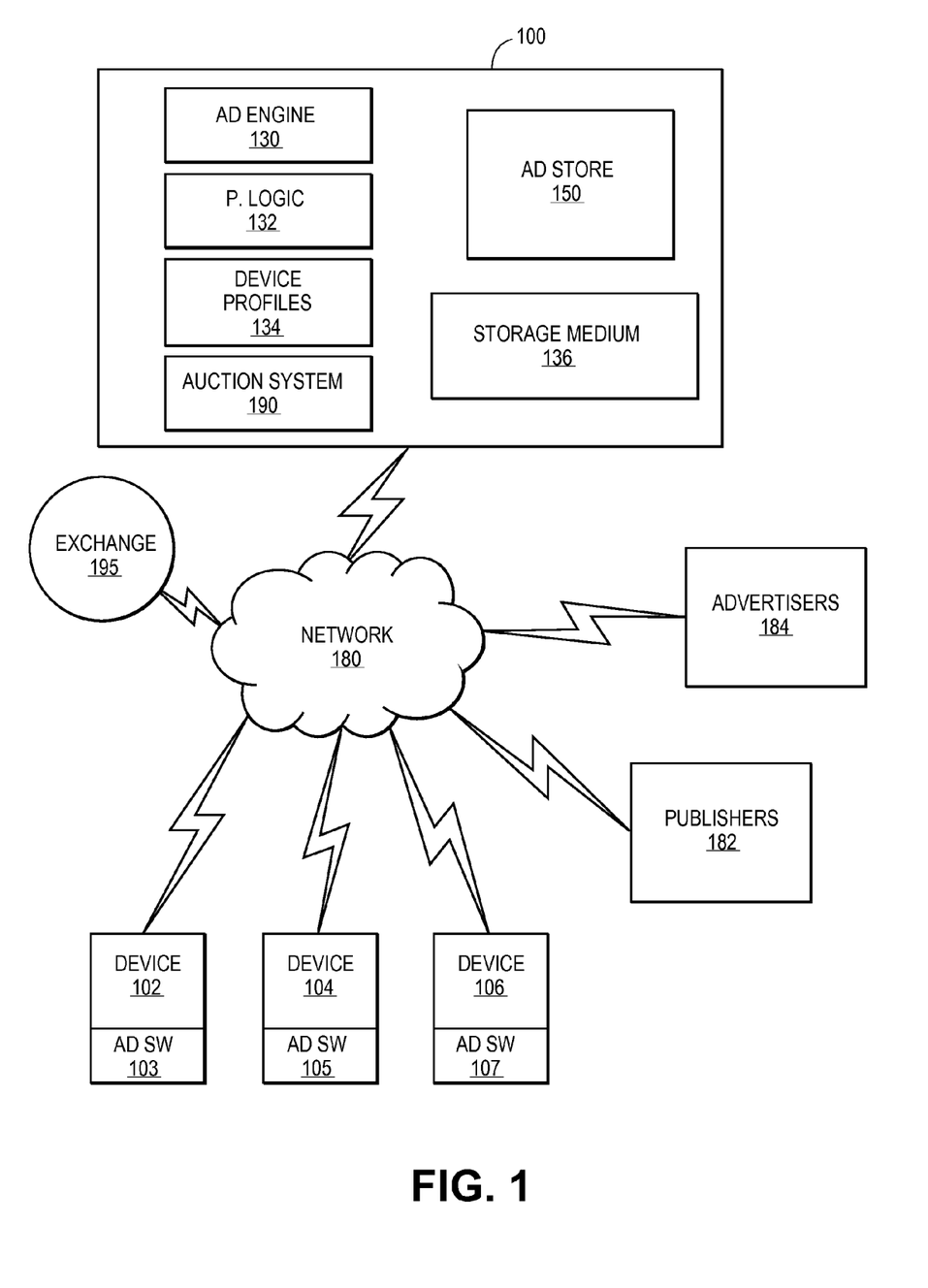
FIG. 1 shows an embodiment of a block diagram of a system 100 for providing advertising services with an advertising exchange in accordance with one embodiment.

FIG. 1 shows an embodiment of a block diagram of an ad system 100 for providing advertising services with an advertising exchange in accordance with one embodiment. The ad system 100 includes an advertising engine 130, processing logic 132, device profiles 134, storage medium 136, and an auction system 190. The auction system 190 may be integrated with the ad system or separate from the ad system. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, etc.). A device profile for a device is based on one or more parameters including location (e.g., GPS coordinates, IP address, cellular triangulation, etc.) of the device, a social profile for a user of the device, and categories or types of applications installed on the device. Each device includes a respective advertising services software 103, 105, 107 (e.g., a software development kit (SDK)) that includes a set of software development tools for advertising services including in-app advertising services. The publishers 182 publish content along with ads. The system 100, devices 102, 104, 106, advertisers 184, publishers, and an ad exchange 195 with third party exchange participants communicate via a network 180 (e.g., Internet, wide area network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134), and user characteristics (e.g., age, gender, ethnicity, location, etc.), etc.

In one embodiment, the system 100 includes a storage medium 136 to store one or more software programs. Processing logic (e.g., 132) is configured to execute instructions of at least one software program to receive an advertising request from a device upon the device having an ad play event for an initiated software application and associated advertising services software (e.g., software development kit (SDK)) on the device. The processing logic is further configured to send a configuration file to the device in response to the configuration call. The configuration file includes different options for obtaining an advertisement (ad) to play on the device during an ad play event. The options include playing at least one ad cached on the device, obtaining at least one ad from an ad store of the ad system 100, and obtaining at least one ad from an advertising exchange that includes $3^{rd}$ party participants.

Figure 2:
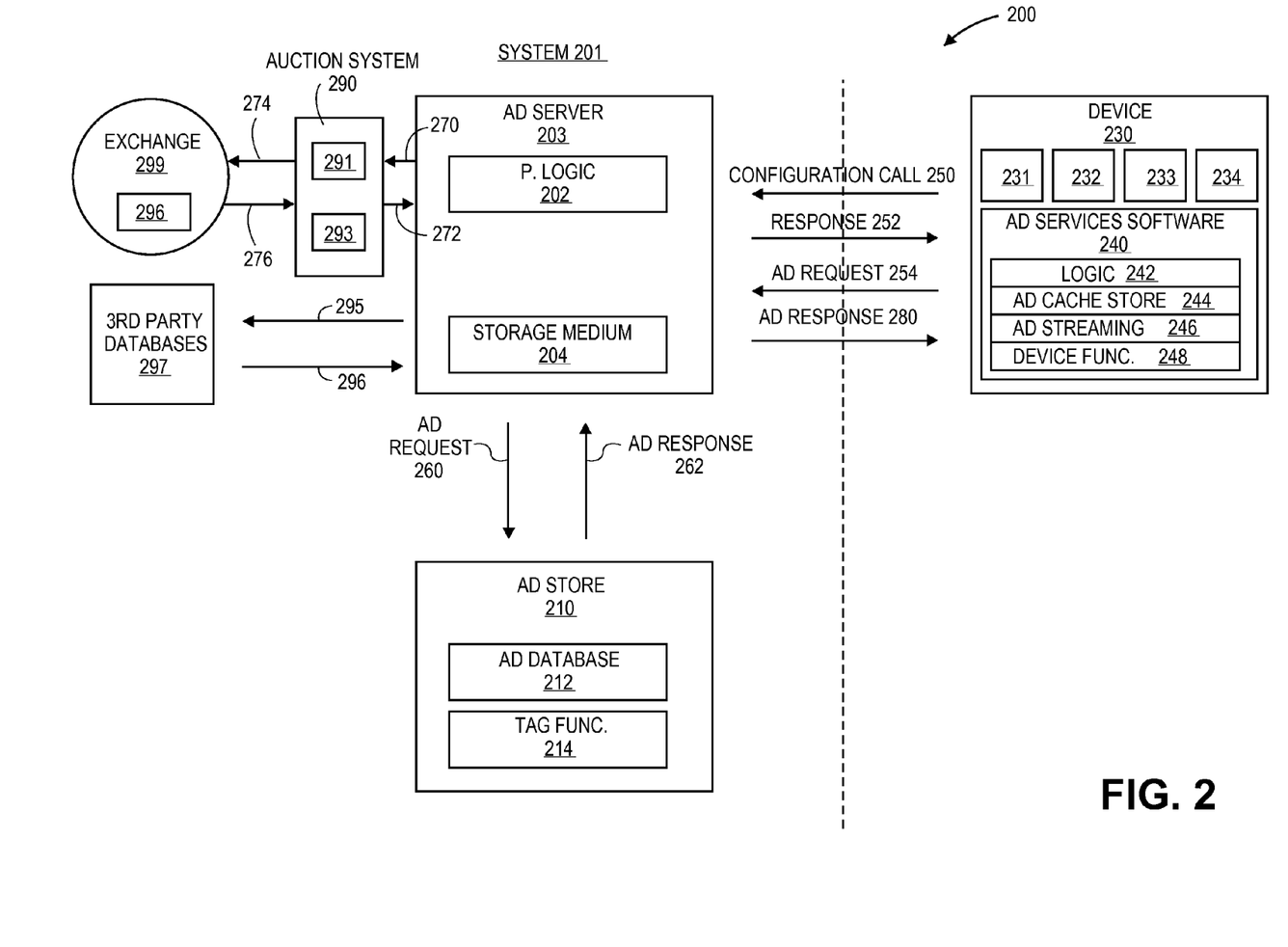
FIG. 2 illustrates a flow diagram of operations for providing advertising services including ads or ad campaigns with an advertising exchange having third party exchange participants in accordance with certain embodiments.

FIG. 2 illustrates a flow diagram of operations for providing advertising services including ads or ad campaigns with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 upon the initiation of the advertising services software 240. At operation 252, the processing logic 202 sends a response that includes the configuration file to the device 230 in response to the configuration call. The configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 provides the at least one better ad in a timely manner (e.g., in time for the ad play event, within a time period set by the configuration file) then the better ad will play during the ad play event. Otherwise, the cached ad is played. A third option includes planning to play at least one ad that is cached on the device 230 but asking for at least one better ad from the exchange 299. If the exchange 299 including third party databases 296 provides the at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices using the configuration file.

At operation 254, upon a play ad event, the processing logic of the ad server receives an ad request with a configurable option (e.g., options 1-8) of the configuration file. The ad request may also include different types of information including a publisher of the selected software application, placement information for placement of an ad in-app, user characteristics, and device characteristics. The ad server processes the ad request and accesses at least one of the ad store 210 and the exchange 299 for options 2-8 of the configuration file. The ad server may determine which option of options 1-8 will be processed or enabled for processing the ad request based on one or more configurable parameters. Alternatively, the device or user may determine which option of options 1-8 will be processed or enabled based on these parameters. In one embodiment, the configurable parameters include the bandwidth for the connection between the device and the ad server, device characteristics, user characteristics, a service level agreement of the publisher (e.g., latency), a cache window, and business rules including location, time of day, availability of new ad campaigns, and availability of higher converting campaigns.

For option 1, the device plays at least one ad from cache. For options that access the ad store 210, at operation 260, the processing logic 202 sends an ad call or request to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the ad call or request. The ad response includes a payload with one or more potential ads or ads campaigns for being streamed to the device 230 or optionally an ad serving tag for accessing one or more third party ad databases 297. If the ad server receives an ad serving tag, then the ad server sends an ad request to the third party database at operation 295 and receives an ad response at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 based on the determined or selected option of the configurable file.

The ad server upon processing the ad request at operation 254 may access the exchange 299 given certain options (e.g., options 3, 4, 7, and 8) of the configuration file. In this case, the ad server sends an exchange request 270 to the auction system 290 having an auction engine 291 and database 293. Alternatively, the auction system is integrated with the ad system 201. The auction engine 291 processes the exchange request 270 and generates an auction based on different business rules including at least one of a price (e.g., a floor or lowest price for the ad or ad campaign), inventory allocation, and participants who can participate in the auction. The auction determines which participant can provide a better ad for the device in a timely manner. At operation 274, the auction engine 291 sends an ad exchange request to each participant of the auction. The ad exchange request includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with an ad exchange response at operation 276. The auction engine processes the ad exchange responses (bids) and determines which participant(s) if any will serve a better ad for playing on the device. The responses and ads from the participants can be saved in the database 293. At operation 272, an ad response is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 280, the ad server can then select at least one better ad from the ad store, a participant with a winning or selected bid from the exchange, a cached ad on the device, or optionally a third party database 297 that has not participated in the exchange. A better ad is anticipated to be more likely to convert than a cached ad on the device. The at least one better ad if selected is then cached on the device or streamed to the device and played during the play ad event.

In one embodiment, the exchange is a private exchange that includes a limited number of private participants. The private exchange may be accessed in combination with accessing ads from the ad store and optionally with accessing ads from third party databases via ad serving tags. In another embodiment, the exchange is a public exchange that includes a limited number of public participants or an unlimited number of participants that meet the requirements of the configurable parameters. The public exchange may be accessed in combination with accessing ads from the ad store and optionally with accessing ads from third party databases via ad serving tags.

In a conventional ad network, a user initiates a software application on a mobile device and then the mobile device sends an ad request to the ad network. The ad network responds with an ad response. The mobile device then caches the ad contained with the ad response and plays the ad from cache during a play ad event. However, better, fresher, more relevant ads (i.e., higher converting ads) may be available in comparison to the cached ad of the conventional ad network.

Figure 3A:
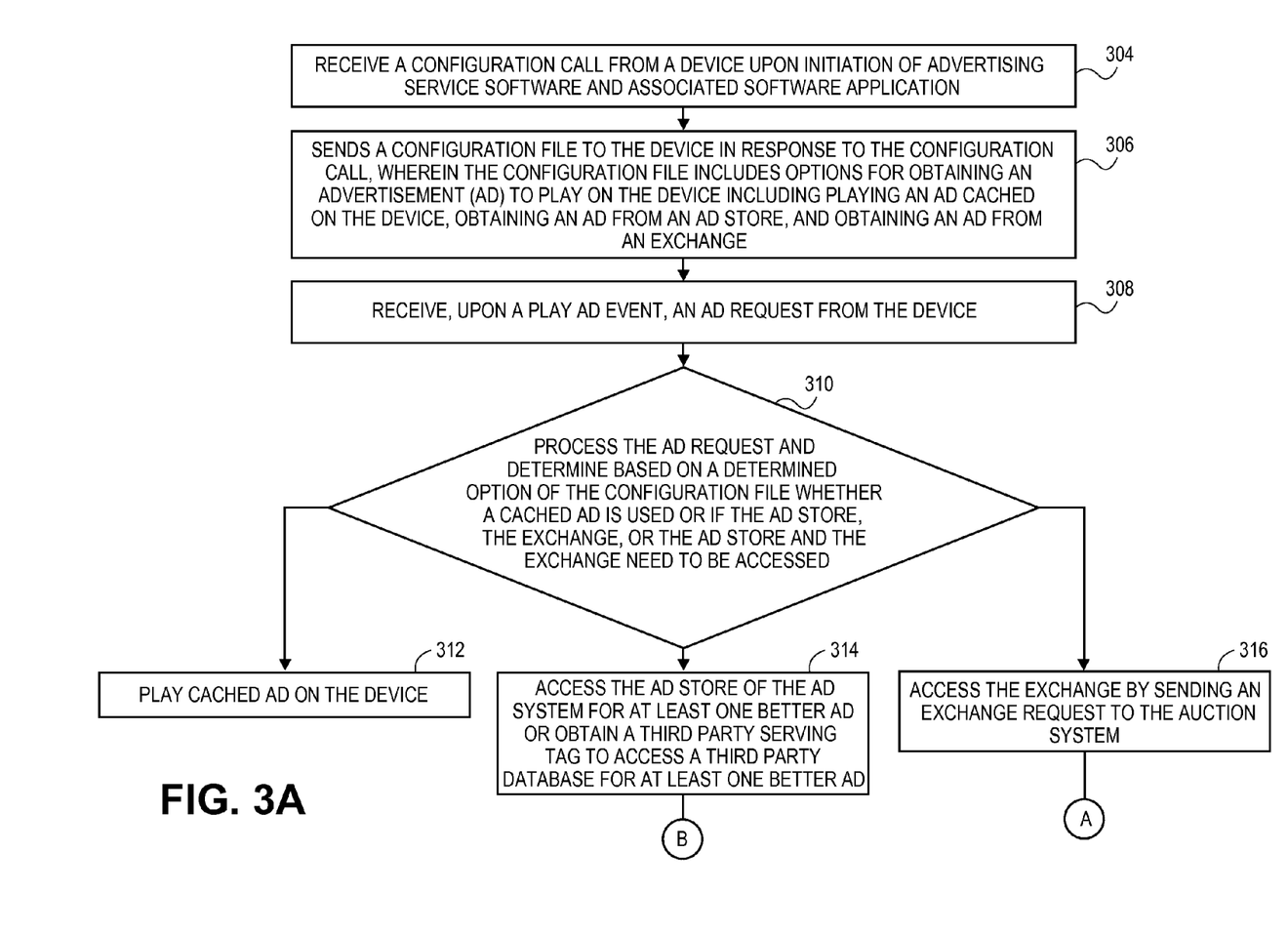
FIGS. 3A and 3B illustrate flow diagrams of operations for a method of providing advertising services including ads or ad campaigns with an advertising exchange having third party exchange participants in accordance with certain embodiments.
Figure 3B:
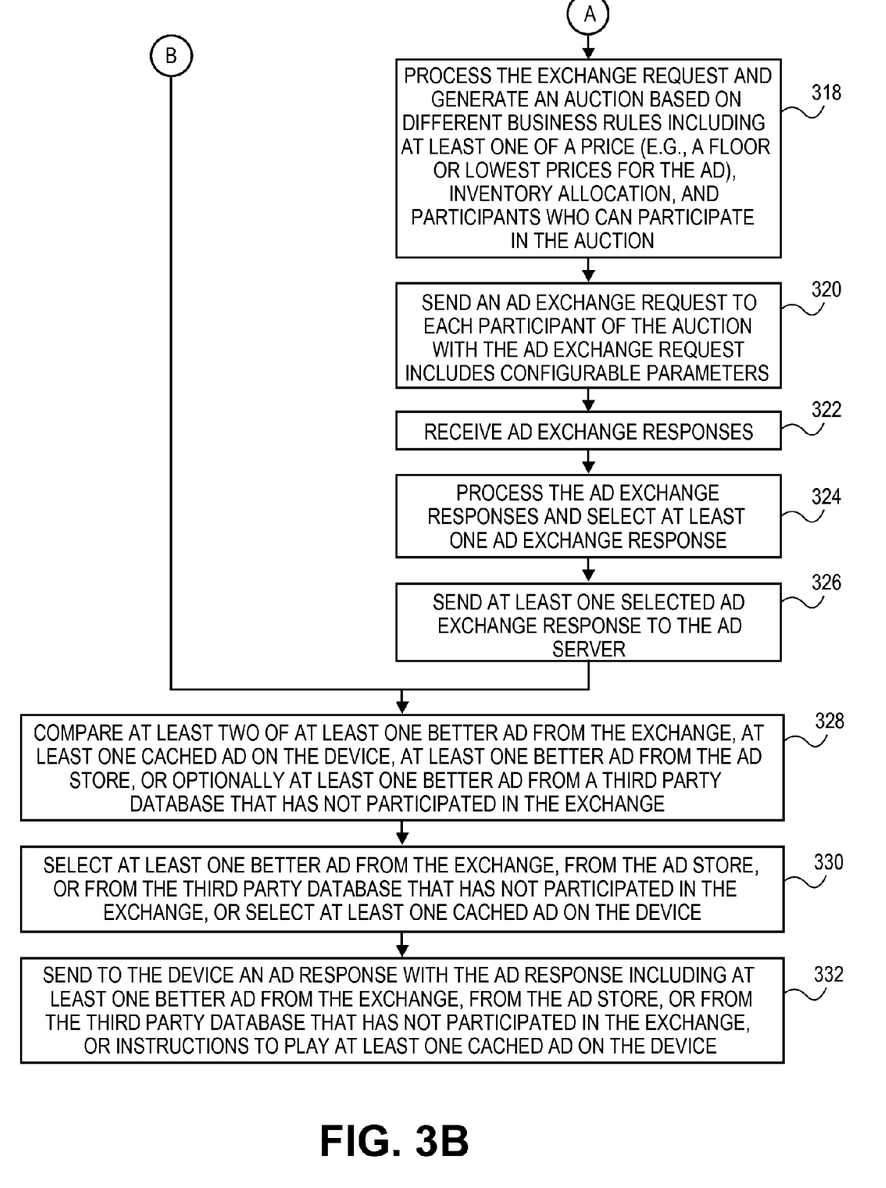

FIGS. 3A and 3B illustrate flow diagrams of operations for a method of providing advertising services including ads or ad campaigns with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 300.

In one embodiment, a device initiates a software application. For example, a user may select one of the software applications. The advertising services software (e.g., SDK) is also initiated upon the initiation of the software application. The advertising services software may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 304, an ad server (e.g., ad server 204) of an ad system receives a configuration call from the device upon the initiation of the advertising services software. At operation 306, the ad server sends a configuration file to the device in response to the configuration call. The configuration file includes different options (e.g., options 1-8 as described in conjunction with the description of FIG. 2) for obtaining an ad to play for the ad play event.

At operation 308, upon a play ad event, the processing logic of the ad server receives an ad request with a configurable option (e.g., options 1-8) of the configuration file. At operation 310, the ad server processes the ad request and determines based on a determined option of the configuration file whether a cached ad on the device will be used (e.g., option 1 playing ad from device cache) or the ad store, the exchange, or the ad store and the exchange need to be accessed. The ad server (or device functionality 248 of the device 230) determines which option of options 1-8 (or any available options of the configuration file) will be processed or enabled for processing the ad request based on one or more configurable parameters. In one embodiment, the configurable parameters include the bandwidth for the connection between the device and the ad server, device characteristics, user characteristics, a service level agreement of the publisher (e.g., latency), a cache window, and business rules including location, time of day, availability of new ad campaigns, and availability of higher converting campaigns.

At operation 312, for option 1, at least one ad is played on the device from cached ads on the device. At operation 314, for ad store options (e.g., options 2, 4, 6, or 8), the ad server accesses the ad store of the ad system for at least one better ad or obtains a third party serving tag to access a third data base for at least one better ad. At operation 316, the ad server upon processing the ad request may access the exchange given certain options (e.g., options 3, 4, 7, and 8) of the configuration file. In this case, the exchange is accessed by the ad server sending an exchange request to the auction system. At operation 318, the auction system processes the exchange request and generates an auction based on different business rules including at least one of price (e.g., a floor or lowest price for the ad), inventory allocation, and participants who can participate in the auction. The auction determines which participant can provide at least one better ad for the device in a timely manner for a higher price. At operation 320, the auction engine sends an ad exchange request to each participant of the auction. The ad exchange request includes configurable parameters including at least one of ad length, bit rate for playing the ad, ad categories, age ratings, a limit for a number of redirects for obtaining at least one ad to minimize latency, and the floor price. One or more participants then respond with an ad exchange response at operation 322. The auction system processes the ad exchange responses (bids) and selects at least one ad exchange response if any for serving at least one better ad for playing on the device at operation 324. At operation 326, at least one selected ad exchange response is sent from the auction system to the ad server. At operation 328, the ad server can optionally compare at least two of a selected at least one better ad from the exchange, at least one cached ad on the device, at least one better ad obtained from the ad store, or optionally at least one better ad from a third party database 297 that has not participated in the exchange. In another embodiment, the winning or selected at least one ad from the exchange is sent to the device without comparing it to other ads (e.g., a cached ad, a better ad from the ad store). In an embodiment, the better ad from the ad store is sent to the device without comparing it to other ads. At operation 330, the ad server can then select at least one better ad from the ad store, at least one better ad of a selected ad exchange response (bid) from the exchange, at least one cached ad on the device, or optionally at least one better ad from a third party database 297 that has not participated in the exchange. A better ad is anticipated to be more likely to convert (e.g., convert into a click or purchase or transaction) than a cached ad on the device. At operation 332, the ad server can then send to the device an ad response with at least one better ad from the ad store, at least one better ad from exchange, at least one ad from a third party database that has not participated in the exchange, or instructions to play the cached ad on the device. The at least one better ad is then cached on the device or streamed to the device and played during the play ad event.

Figure 4:
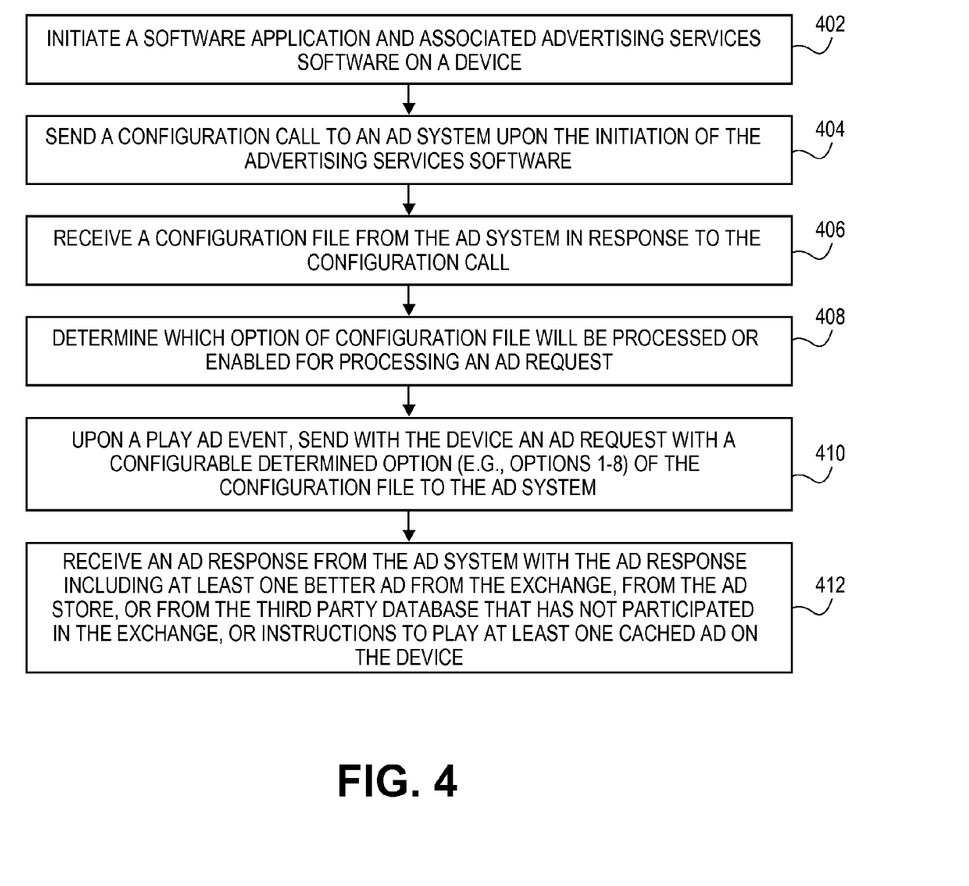
FIG. 4 illustrates a flow diagram of operations for a method of providing advertising services including ads or ad campaigns with an advertising exchange having third party exchange participants in accordance with certain embodiments.

FIG. 4 illustrates a flow diagram of operations for a method of providing advertising services including ads or ad campaigns with an advertising exchange having third party exchange participants in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs the operations of method 400.

In one embodiment, a device initiates a software application at operation 402. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 404, the device sends a configuration call to an ad server of an ad system upon the initiation of the advertising services software. At operation 406, the device receives a configuration file from the ad system in response to the configuration call. The configuration file includes different options (e.g., options 1-8 as described in conjunction with the description of FIG. 2) for obtaining at least one ad to play for the ad play event.

At operation 408, the device (or ad system) determines which option (e.g., 1-8) of the configuration file will be processed or enabled for processing an ad request. In one embodiment, this determination is based on one or more configurable parameters including the bandwidth for the connection between the device and the ad server, device characteristics, user characteristics, a service level agreement of the publisher (e.g., latency), a cache window, and business rules including location, time of day, availability of new ad campaigns, and availability of higher converting campaigns. At operation 410, upon a play ad event, the device sends the ad request with a configurable determined option (e.g., options 1-8, any available options) of the configuration file to the ad server. The ad server processes the ad request and performs operations similar to operations 312-330 of FIG. 3. At operation 412, the device receives an ad response from the ad system. The ad response includes at least one better ad from the ad store, at least one better ad from the exchange, optionally instructions to play at least one ad cached on the device, or optionally at least one better ad from a third party database that has not participated in the ad exchange for options 2-8. The at least one better ad is then cached on the device or streamed to the device and played during the play ad event. For option 1, the at least one cached ad is played on the device during the play ad event.

In some embodiments, the operations of the methods disclosed herein can be altered, modified, combined, or deleted. For example, the operation 308 can occur early or later in the flow of operations of method 300. This determination of operation 308 may not occur until a latency is known for obtaining an ad from the ad store or from the exchange. In a similar manner, the operation 410 can occur early or later in the flow of operations of method 400. This determination of operation 410 may not occur until a latency is known for obtaining an ad from the ad store or from the exchange. The methods in embodiments of the present invention may be performed with an apparatus or data processing system as described herein. The apparatus or data processing system may be a conventional, general-purpose computer system or special purpose computers, which are designed or programmed to perform only one function, may also be used.

Figure 5:
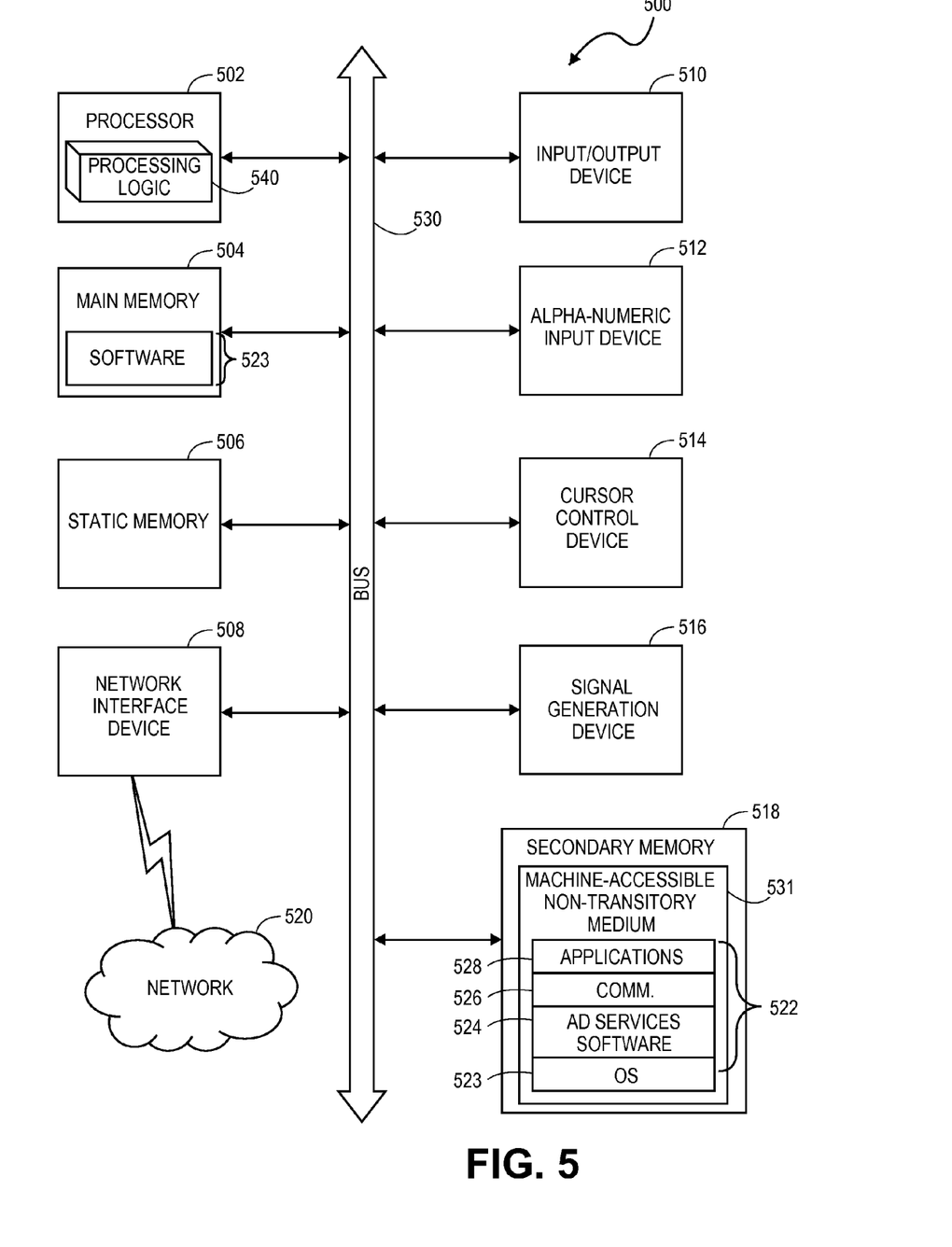
FIG. 5 illustrates a diagrammatic representation of a machine in the exemplary form of a device 500 within which a set of instructions, for causing the machine to perform any one or more of the methodologies discussed herein, may be executed in accordance with certain embodiments.

FIG. 5 illustrates a diagrammatic representation of a machine in the exemplary form of a computer system or device 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The exemplary device 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The device 500 may further include a network interface device 508. The device 500 also may include an input/output device 510 or display (e.g., a liquid crystal display (LCD), a plasma display, a cathode ray tube (CRT), or touch screen for receiving user input and displaying output), an optional alphanumeric input device 512 (e.g., a keyboard), an optional cursor control device 514 (e.g., a mouse), and a signal generation device 516 (e.g., a speaker).

The data storage device 518 may include a machine-accessible non-transitory medium 531 on which is stored one or more sets of instructions (e.g., software 522) embodying any one or more of the methodologies or functions described herein. The software 522 may include an operating system 523, advertising services software 524 (e.g., SDK 524), communications module 526, and applications 528 (e.g., publisher applications). The software 522 may also reside, completely or at least partially, within the main memory 504 (e.g., software 523) and/or within the processor 502 during execution thereof by the device 500, the main memory 504 and the processor 502 also constituting machine-accessible storage media. The software 522 or 523 may further be transmitted or received over a network 520 via the network interface device 508.

The machine-accessible non-transitory medium 531 may also be used to store data structure sets that define user identifying states and user preferences that define user profiles. Data structure sets and user profiles may also be stored in other sections of device 500, such as static memory 506.

In one embodiment, a machine-accessible non-transitory medium contains executable computer program instructions which when executed by a data processing system cause the system to perform any of the methods discussed herein.

For example, in one embodiment, a machine-accessible non-transitory medium contains executable computer program instructions which when executed by a data processing system cause the system to perform a method. The method includes receiving a configuration call from a device upon initiation of a software application and associated advertising services software and sending a configuration file to the device in response to the configuration call. The configuration file includes options for obtaining an advertisement (ad) to play on the device including playing at least one ad cached on the device, obtaining at least one ad from an ad store, and obtaining at least one ad from an ad exchange.

For example, in one embodiment, the method further includes receiving an ad request, upon a play ad event of a software application that is associated with the advertising services software, and processing the ad request.

For example, in one embodiment, the method further includes accessing the ad exchange given certain options of the configuration file and generating an auction based on different business rules including at least one of floor price, inventory allocation, and participants who can participate in the auction.

For example, in one embodiment, the method further includes sending an ad exchange request to each participant of the auction with the ad exchange request including configurable parameters including at least one of ad length, bit rate for playing the ad, ad categories, age ratings, a limit for a number of redirects to minimize latency, and the floor price.

For example, in one embodiment, the method further includes receiving ad exchange responses from one or more participants of the auction; processing the ad exchange responses and determining which of the one or more participants if any will serve at least one ad for playing on the device.

For example, in one embodiment, the method further includes sending to the device an ad response with at least one ad from one of the ad store and a selected participant from the exchange.

While the machine-accessible non-transitory medium 531 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system includes a storage medium to store one or more software programs and processing logic that is configured to execute instructions of at least one software program to receive a configuration call from a device upon initiation of a software application and associated advertising services software (e.g., software development kit (SDK)) on the device. The processing logic is further configured to send a configuration file to the device in response to the configuration call. The configuration file includes different options for obtaining an advertisement (ad) to play on the device during an ad play event. The options include playing at least one ad cached on the device, obtaining at least one ad from an ad store of the ad system, and obtaining at least one ad from an advertising exchange that includes third party participants.

For example, in one embodiment, the processing logic is further configured to execute instructions of at least one software program to receive an ad request, upon a play ad event of a software application that is associated with the advertising services software, and process the ad request.

For example, in one embodiment, the processing logic is further configured to execute instructions of at least one software program to access the ad exchange given certain options of the configuration file and generate an auction based on different business rules including at least one of a floor price, inventory allocation, and participants who can participate in the auction.

For example, in one embodiment, the processing logic is further configured to execute instructions of at least one software program to send an ad exchange request to each participant of the auction with the ad exchange request including configurable parameters including at least one of ad length, bit rate for playing the ad, ad categories, age ratings, a limit for a number of redirects to minimize latency, and the floor price.

For example, in one embodiment, the processing logic is further configured to execute instructions of at least one software program to receive ad exchange responses from one or more participants of the auction, process the ad exchange responses, and determine which of the one or more participants if any will serve at least one ad for playing on the device.

For example, in one embodiment, the processing logic is further configured to execute instructions of at least one software program to send to the device an ad response with at least one ad from one of the ad store and a selected participant from the exchange.

In one embodiment, an apparatus for providing advertising services includes a means for receiving a configuration call from a device upon initiation of a software application and associated advertising services software and a means for sending a configuration file to the device in response to the configuration call. The configuration file includes a plurality of options for obtaining an advertisement (ad) to play on the device including playing at least one ad cached on the device, obtaining at least one ad from an ad store, and obtaining at least one ad from an ad exchange.

For example, in one embodiment, the apparatus includes a means for accessing the ad exchange given certain options of the configuration file and a means for generating an auction based on different business rules including at least one of a floor price, inventory allocation, and participants who can participate in the auction.

For example, in one embodiment, the apparatus includes a means for sending an ad exchange request to each participant of the auction with the ad exchange request including configurable parameters including at least one of ad length, bit rate for playing the ad, ad categories, age ratings, a limit for a number of redirects to minimize latency, and the floor price, a means for receiving ad exchange responses from one or more participants of the auction, a means for processing the ad exchange responses, and a means for determining which of the one or more participants if any will serve at least one ad for playing on the device.

In one embodiment, a machine-accessible non-transitory medium containing executable computer program instructions which when executed by a device cause said device to perform a method. The method includes initiating a software application on a device, sending a configuration call to an ad system upon the initiation of the software application and associated advertising services software, and receiving a configuration file from the ad system in response to the configuration call. The configuration file includes options for obtaining an advertisement (ad) to play on the device including playing at least one ad cached on the device, obtaining at least one ad from an ad store, and obtaining at least one ad from an ad exchange.

For example, in one embodiment, the method further includes determining which option of the configuration file will be processed or enabled for processing an ad request based on one or more configurable parameters including at least one of a bandwidth for a connection between the device and the ad system, device characteristics, user characteristics, a service level agreement of a publisher of the software application, a cache window, and business rules.

For example, in one embodiment, the method further includes upon a play ad event, sending the ad request with a configurable determined option of the configuration file to the ad system and receiving an ad response from the ad system with the ad response including at least one better ad from the ad store, at least one better ad from the ad exchange, at least one better ad from a third party database that has not participated in the ad exchange, or instructions to play at least one ad cached on the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An advertising system for improved network bandwidth utilization in obtaining at least one ad to be delivered via a network connection to a client wireless device, comprising:
    a storage medium to store one or more software programs; and
    an ad server coupled to the storage medium, the ad server including dedicated ad functionality with processing logic including at least one processor of the ad server that is configured to execute instructions of at least one software program to:
    receive a configuration call from the client wireless device upon initiation of a content software application and initiation of associated advertising services software on the client wireless device;
    send a configuration file to the client wireless device in response to the configuration call, wherein the configuration file includes a plurality of options for obtaining an advertisement (ad) to play during a play ad event in-app within the content software application on a graphical user interface of the client wireless device including a first option for playing in-app at least one ad cached on the client wireless device, a second option for planning to play at least one ad cached on the client wireless device and requesting at least one ad from an ad store of the advertising system to be played in-app if available in a timely manner due to being more likely to convert than the at least one ad cached on the client wireless device, and a third option for planning to play in-app at least one ad cached on the client wireless device and requesting at least one ad from an ad exchange to be played in-app using real time bidding if available in a timely manner due to being more likely to convert than the at least one ad cached on the client wireless device;
    receive an ad request from the client wireless device, upon a play ad event of the software application on the client wireless device; and
    determine, with the processing logic including at least one processor of the ad server, based on a determined option of the configuration file whether at least one cached ad on the client wireless device will be used in-app, whether the ad store of the advertising system to be accessed for at least one ad to be played in-app, or whether the ad exchange to be accessed for at least one ad to be played in-app using real time bidding of ad exchange participants, wherein the determined option is based on configurable parameters including bandwidth of the network connection including a wide area network between the advertising system and the client wireless device for improved bandwidth utilization in obtaining the at least one ad to be delivered via the network to the client wireless device and availability of higher converting ad campaigns from the ad store or ad exchange for improved utilization of ad campaigns.

2. The advertising system of claim 1, wherein the processing logic is further configured to execute instructions of at least one software program to:
    access the ad store of the advertising system to obtain at least one ad based on a conversion rate of the at least one ad of the ad store if the second option of the configuration file is determined.

3. The advertising system of claim 1, wherein the processing logic is further configured to execute instructions of at least one software program to:
    access the ad exchange to obtain at least one ad based on a conversion rate of the at least one ad of the ad exchange if the third option of the configuration file is determined; and
    generate an auction based on different business rules including a floor price, inventory allocation, and participants who can participate in the auction.

4. The system of claim 3, wherein the processing logic is further configured to execute instructions of at least one software program to:
    send an ad exchange request to each participant of the auction with the ad exchange request including configurable parameters including ad length, bit rate for playing the ad, ad categories, age ratings, a limit for a number of redirects to minimize latency, and the floor price.

5. The system of claim 4, wherein the processing logic is further configured to execute instructions of at least one software program to:
    receive ad exchange responses from one or more participants of the auction;
    process the ad exchange responses; and
    determine which of the one or more participants if any will serve at least one ad for playing on the device.

6. The system of claim 5, wherein the processing logic is further configured to execute instructions of at least one software program to:
    send to the device an ad response with at least one ad from one of the ad store and a selected participant from the exchange.

7. A machine-accessible non-transitory medium containing executable computer program instructions which when executed by a data processing system cause said system to perform a method for improved network bandwidth utilization in obtaining at least one ad to be delivered via a network connection to a client wireless device, the method comprising:
    receiving a configuration call from the client wireless device upon initiation of a content software application and associated advertising services software on the client wireless device;
    sending a configuration file to the client wireless device in response to the configuration call, wherein the configuration file includes a plurality of options for obtaining an advertisement (ad) to play during a play ad event in-app within the content software application on a graphical user interface of the client wireless device including a first option for playing in-app at least one ad cached on the client wireless device, a second option for planning to play at least one ad cached on the client wireless device and requesting at least one ad from an ad store of the system to be played in-app if available in a timely manner due to being more likely to convert than the at least one ad cached on the client wireless device, and a third option for planning to play in-app at least one ad cached on the client wireless device and requesting at least one ad from an ad exchange to be played in-app using real time bidding if available in a timely manner due to being more likely to convert than the at least one ad cached on the client wireless device;

receiving an ad request from the client wireless device, upon a play ad event of the software application; and determining, with processing logic including at least one processor of an ad server of the system, based on a determined option of the configuration file whether at least one cached ad on the client wireless device will be used in-app, whether the ad store of the system to be accessed for at least one ad to be played in-app, or whether the ad exchange to be accessed for at least one ad to be played in-app using real time bidding of ad exchange participants, wherein the determined option is based on configurable parameters including bandwidth of the network connection including a wide area network between the advertising system and the client wireless device for improved bandwidth utilization in obtaining the at least one ad to be delivered via the network to the client device and availability of higher converting ad campaigns from the ad store or ad exchange for improved utilization of ad campaigns.

8. The machine-accessible non-transitory medium of claim 7, the method further comprising:

accessing the ad store of the system to obtain at least one ad based on a conversion rate of the at least one ad of the ad store if the second option of the configuration file is determined.

9. The machine-accessible non-transitory medium of claim 7, the method further comprising:

accessing the ad exchange to obtain at least one ad based on a conversion rate of the at least one ad of the ad exchange if the third option of the configuration file is determined; and generating an auction based on different business rules including floor price, inventory allocation, and participants who can participate in the auction.

10. The machine-accessible non-transitory medium of claim 9, the method further comprising:

sending an ad exchange request to each participant of the auction with the ad exchange request including configurable parameters including ad length, bit rate for playing the ad, ad categories, age ratings, a limit for a number of redirects to minimize latency, and the floor price.

11. The machine-accessible non-transitory medium of claim 10, the method further comprising:

receiving ad exchange responses from one or more participants of the auction;

processing the ad exchange responses; and determining which of the one or more participants if any will serve at least one ad for playing on the device.

12. The machine-accessible non-transitory medium of claim 11, the method further comprising:

sending to the device an ad response with at least one ad from one of the ad store and a selected participant from the exchange.

13. A method for improved network bandwidth utilization in obtaining at least one ad via a network connection for a client wireless device comprising:

initiating a software application on the client wireless device;

sending a configuration call to an ad system upon the initiation of the software application and associated advertising services software on the client wireless device;

receiving a configuration file from the ad system in response to the configuration call, wherein the configuration file includes a plurality of options for obtaining an advertisement (ad) to play during a play ad event in-app within the content software application on a graphical user interface of the client wireless device including a first option for playing in-app at least one ad cached on the client wireless device, a second option for planning to play at least one ad cached on the client wireless device and requesting at least one ad from an ad store of the advertising system to be played in-app if available in a timely manner due to being more likely to convert than the at least one ad cached on the client wireless device, and a third option for planning to play in-app at least one ad cached on the client wireless device and requesting at least one ad from an ad exchange to be played in-app using real time bidding if available in a timely manner due to being more likely to convert than the at least one ad cached on the client wireless device;

determining, with at least one processor of the client wireless device that is configured to execute instructions of device functionality, a configurable option of the configuration file that indicates whether at least one cached ad on the client wireless device will be used in-app for the first option, whether the ad store of the system to be accessed for at least one ad to be played in-app for the second option, or whether the ad exchange to be accessed for at least one ad to be played in-app using real time bidding of ad exchange participants for the third option; and upon a play ad event, sending the ad request with the configurable determined option of the configuration file to the ad system, wherein the determined option is based on configurable parameters including bandwidth of the network connection including a wide area network between the ad system and the client wireless device for improved bandwidth utilization in obtaining the at least one ad via the network for the client device and availability of higher converting ad campaigns from the ad store or ad exchange for improved utilization of ad campaigns.

14. The method of claim 13, further comprising:

determining which option of the configuration file will be processed or enabled for processing an ad request based on one or more configurable parameters including at least one of a bandwidth for a connection between the client wireless device and the ad system, device characteristics, user characteristics, a service level agreement of a publisher of the software application, a cache window, and business rules.

15. The method of claim 14, further comprising:

receiving an ad response from the ad system with the ad response including at least one ad from the ad store based on a conversion rate of the at least one ad from the ad store, at least one ad from the ad exchange based on a conversion rate of the at least one ad from the ad exchange, at least one ad from a third party database that has not participated in the ad exchange based on a conversion rate of the at least one ad from the third party database, or instructions to play at least one ad cached on the client wireless device.

16. A machine-accessible non-transitory medium containing executable computer program instructions which when executed by a client wireless device cause said client wireless device to perform a method for improved network bandwidth utilization in obtaining at least one ad via a network connection for the client wireless device, the method comprising:

initiating a software application on the client wireless device;

sending a configuration call to an ad system upon the initiation of the software application and associated advertising services software on the client wireless device;

receiving a configuration file from the ad system in response to the configuration call, wherein the configuration file includes a plurality of options for obtaining an advertisement (ad) to play during a play ad event in-app within the content software application on a graphical user interface of the client wireless device including a first option for playing in-app at least one ad cached on the client wireless device, a second option for planning to play at least one ad cached on the client wireless device and requesting at least one ad from an ad store of the ad system to be played in-app if available in a timely manner due to being more likely to convert than the at least one ad cached on the client wireless device, and a third option for planning to play in-app at least one ad cached on the client wireless device and requesting at least one ad from an ad exchange to be played in-app using real time bidding if available in a timely manner due to being more likely to convert than the at least one ad cached on the client wireless device;

determining, with at least one processor of the client wireless device that is configured to execute instructions of device functionality, a configurable option of the configuration file that indicates whether at least one cached ad on the client wireless device will be used in-app for the first option, whether the ad store of the system to be accessed for at least one ad to be played in-app for the second option, or whether the ad exchange to be accessed for at least one ad to be played in-app using real time bidding of ad exchange participants for the third option; and upon a play ad event, sending the ad request with the configurable determined option of the configuration file to the ad system, wherein the determined option is based on configurable parameters including bandwidth of the network connection including a wide area network between the ad system and the client device for improved bandwidth utilization in obtaining the at least one ad via the network to the client wireless device and availability of higher converting ad campaigns from the ad store or ad exchange for improved utilization of ad campaigns.

17. The machine-accessible non-transitory medium of claim 16, the method further comprising:

determining which option of the configuration file will be processed or enabled for processing an ad request based on one or more configurable parameters including at least one of a bandwidth for a connection between the client wireless device and the ad system, device characteristics, user characteristics, a service level agreement of a publisher of the software application, a cache window, and business rules.

18. The machine-accessible non-transitory medium of claim 17, the method further comprising:

receiving an ad response from the ad system with the ad response including at least one ad from the ad store based on a conversion rate of the at least one ad from the ad store, at least one ad from the ad exchange based on a conversion rate of the at least one ad from the ad exchange, at least one ad from a third party database that has not participated in the ad exchange based on a conversion rate of the at least one ad from the third party database, or instructions to play at least one ad cached on the client device.

19. The system of claim 1, wherein the processing logic is further configured to execute instructions of at least one software program to:

access the ad store or the ad exchange to obtain at least one ad based on a conversion rate of the at least one ad from the ad store or the ad exchange if a fourth option of the configuration file is determined;

stream at least one ad to be played during the ad play event if a fifth option of the configuration file is determined; and access the system to obtain at least one ad based on a conversion rate of the at least one ad of the system that is planned for streaming to the client device if a sixth option of the configuration file is determined.

20. The machine-accessible non-transitory medium of claim 7, the method further comprising:

accessing the ad store or the ad exchange to obtain at least one ad based on a conversion rate of the at least one ad from the ad store or the ad exchange if a fourth option of the configuration file is determined;

streaming at least one ad to be played during the ad play event if a fifth option of the configuration file is determined; and accessing the system to obtain at least one ad based on a conversion rate of the at least one ad of the system that is planned for streaming to the client wireless device if a sixth option of the configuration file is determined.

21. An apparatus for improved network bandwidth utilization in obtaining at least one ad to be obtained via a network connection to a client wireless device, comprising:

means for storing one or more software programs; and means for receiving a configuration call from the client wireless device upon initiation of a software application and initiation of associated advertising services software on the client device;

means for sending a configuration file to the client wireless device in response to the configuration call, wherein the configuration file includes a plurality of options for obtaining an advertisement (ad) to play during a play ad event in-app within the content software application on a graphical user interface of the client wireless device including a first option for playing in-app at least one ad cached on the client wireless device, a second option for planning to play at least one ad cached on the client wireless device and requesting at least one ad from an ad store of the advertising system to be played in-app if available in a timely manner due to being more likely to convert than the at least one ad cached on the client wireless device, and a third option for planning to play in-app at least one ad cached on the client wireless device and requesting at least one ad from an ad exchange to be played in-app using real time bidding if available in a timely manner due to being more likely to convert than the at least one ad cached on the client wireless device;

means for receiving an ad request, upon a play ad event of the software application; and means for determining based on a determined option of the configuration file whether at least one cached ad on the client wireless device will be used in-app, whether the ad store of the advertising system to be accessed for at least one ad to be played in-app, or whether the ad exchange to be accessed for at least one ad to be played in-app using real time bidding of ad exchange participants, wherein the determined option is based on configurable parameters including bandwidth of the network connection including a wide area network between the advertising system and the client wireless device for improved bandwidth utilization in obtaining the at least one ad via the network to the client device and availability of higher converting ad campaigns from the ad store or ad exchange for improved utilization of ad campaigns.

22. The apparatus of claim 21, further comprising:

means for accessing the ad store of the advertising system to obtain at least one ad based on a conversion rate of the at least one ad of the ad store if the second option of the configuration file is determined.

23. The apparatus of claim 21, further comprising:

means for accessing the ad exchange to obtain at least one ad based on a conversion rate of the at least one ad of the ad exchange if the third option of the configuration file is determined; and means for generating an auction based on different business rules including a floor price, inventory allocation, and participants who can participate in the auction.

\* \* \* \* \*